United States Patent
Huang et al.

(10) Patent No.: US 7,840,088 B2
(45) Date of Patent: Nov. 23, 2010

(54) METHOD OF REDUCING IMAGE NOISE

(75) Inventors: Yu-Chen Huang, Jhudong Township, Hsinchu County (TW); Yin-Pin Chang, Taipei (TW)

(73) Assignee: Altek Corporation, Hsinchu (TW)

( * ) Notice: Subject to any disclaimer, the term of this patent is extended or adjusted under 35 U.S.C. 154(b) by 903 days.

(21) Appl. No.: 11/732,249

(22) Filed: Apr. 3, 2007

(65) Prior Publication Data

US 2008/0159643 A1  Jul. 3, 2008

(30) Foreign Application Priority Data

Dec. 27, 2006  (TW) .............................. 95149342 A

(51) Int. Cl.
*G06K 9/00* (2006.01)
*G06K 9/40* (2006.01)

(52) U.S. Cl. ....................... 382/260; 382/167; 382/263; 382/264; 382/274; 382/275

(58) Field of Classification Search ................. 382/167, 382/254, 260–262, 264, 266–268
See application file for complete search history.

(56) References Cited

U.S. PATENT DOCUMENTS

| | | | | |
|---|---|---|---|---|
| 5,629,779 | A * | 5/1997 | Jeon ............................ | 382/239 |
| 7,146,059 | B1 * | 12/2006 | Durand et al. ............... | 382/260 |
| 7,352,911 | B2 * | 4/2008 | Maurer ........................ | 382/260 |
| 7,426,312 | B2 * | 9/2008 | Dance et al. ................. | 382/254 |
| 7,551,794 | B2 * | 6/2009 | Masuno et al. .............. | 382/264 |
| 7,643,699 | B2 * | 1/2010 | Lim et al. .................... | 382/275 |
| 2004/0095357 | A1 * | 5/2004 | Oh et al. ...................... | 345/589 |
| 2005/0025378 | A1 * | 2/2005 | Maurer ........................ | 382/260 |
| 2005/0025379 | A1 * | 2/2005 | Keshet et al. ................ | 382/260 |
| 2005/0025380 | A1 * | 2/2005 | Keshet et al. ................ | 382/260 |
| 2006/0008171 | A1 * | 1/2006 | Petschnigg et al. .......... | 382/254 |
| 2007/0165962 | A1 * | 7/2007 | Smirnov et al. ............. | 382/260 |
| 2008/0095431 | A1 * | 4/2008 | Ishiga ......................... | 382/167 |
| 2008/0159643 | A1 * | 7/2008 | Huang et al. ................. | 382/260 |
| 2008/0170800 | A1 * | 7/2008 | Bergman et al. ............. | 382/275 |
| 2008/0175510 | A1 * | 7/2008 | Matsushita .................. | 382/260 |
| 2009/0317015 | A1 * | 12/2009 | Porikli ........................ | 382/261 |

FOREIGN PATENT DOCUMENTS

WO  WO 2007144640 A1 * 12/2007

OTHER PUBLICATIONS

Elad, Michael, "On the Origin of the Bilateral Filterand Ways to Improve It", 2002, IEEE Transactions on Image Processing, p. 1141-1151.*
Tomasi, C. et al., "Bilateral filtering for gray and color images", 1998, 6th International Conference on Computer Vision, p. 1-8.*
Huang, Yen-Lan et al. "Noise Reduction Using Enhanced Bilateral Filter", Dec. 4-6, 2006, "Images & Recognition", vol. 12 No. 4, p. 46-53.*

* cited by examiner

*Primary Examiner*—Bhavesh M Mehta
*Assistant Examiner*—Gandhi Thirugnanam
(74) *Attorney, Agent, or Firm*—Tim Tingkang Xia; Morris, Manning & Martin, LLP

(57) ABSTRACT

A method of reducing image noise is provided. In the method, during the process of reducing image noise by a bilateral filter, the image noise filtering intensity of a domain filter in the bilateral filter is adjusted according to whether a regional area of the image has a frame boundary, and the image noise filtering intensity of a range filter in the bilateral filter is adjusted through the intensity of a regional area, so as to improve the image noise reduction effect of the bilateral filter.

4 Claims, 4 Drawing Sheets

METHOD OF REDUCING IMAGE NOISE

CROSS-REFERENCE TO RELATED APPLICATIONS

This non-provisional application claims priority under 35 U.S.C. §119(a) on Patent Application No(s). 095149342 filed in Taiwan, R.O.C. on Dec. 27, 2006, the entire contents of which are hereby incorporated by reference.

BACKGROUND OF THE INVENTION

1. Field of Invention

The present invention relates to a method of reducing image noise. More particularly, the present invention relates to a method of reducing image noise by adjusting the range weight value and domain weight value of a bilateral filter according to image boundary and intensity.

2. Related Art

Among the current methods of reducing image noise, some employ median filter, mean filter, or low pass filter (LPF) and so on for reducing image noise. However, the above methods achieve the purpose by evening pixels in the entire image without making a difference between a smooth area (i.e. the area where most pixels are similar) and a detailed area (i.e. the area containing a boundary) of the image. When the smooth area and the detailed area coexist in an image, the detailed area may become much fuzzier as the pixels therein are evened out together with those in the smooth area. Meanwhile, the method of reducing image noise through evening usually has to make a choice between reducing the image noise and preserving the detailed area, thus making it impossible to improve the image quality. Therefore, a method of reducing image noise by a bilateral filter was proposed in year 1998.

A bilateral filter employs two filters related to domain and range to reconstruct every pixel in an image. The filter related to domain is called domain filter, indicating that the closer a reference pixel is to a target pixel, the higher its reference value will be. Thus, the domain weight value ($W_{domain}$) of a reference pixel closer to a target pixel is higher when the target pixel is reconstructed according to each reference pixel. The filter related to range is called range filter, indicating that the more a surrounding reference pixel is similar to a target pixel, the higher its reference value will be. Thus, the range weight value ($W_{range}$) of a reference pixel more similar to a target pixel is higher when the target pixel is reconstructed according to each reference pixel. Both domain filter and range filter are shift-invariant Gaussian filters. As shown in FIG. 1, if the bilateral filter uses a 3×3 table 100 as a mask of reference scope, a target pixel 101 in the center of the table 100 is reconstructed according to the surrounding first reference pixel 102 to eighth reference pixel 109, and the reconstruction formula is:

$$P_{result} = \frac{\sum_{P_i \in Mask} P_i \times W_{range,i} \times W_{domain,i}}{\sum W_{range,i} \times W_{domain,i}}$$

in which i equals to 1 to 8, respectively corresponding to the first reference pixel 102 to the eighth reference pixel 109, i.e., $P_{result}$ is the target pixel 101 after reconstruction; $W_{range,1}$ is the range weight value of the first reference pixel 102 to the target pixel 101; $W_{domain,1}$ is the domain weight value of the first reference pixel 102 to the target pixel 101, and $W_{range,2}$, $W_{domain,2}$, etc., can be deduced by analogy.

Under the circumstance that more and more high ISO images emerge at present, as high image noise is bound to accompany, the image noise of the high ISO images generally has to be reduced. Though the method of reducing noise by a bilateral filter, the smooth area and the detailed area can be treated separately to improve the image quality, but the effect of image quality improvement by a bilateral filter in reducing high image noise is limited.

SUMMARY OF THE INVENTION

In order to provide the function of reducing high ISO image noise with higher efficacy, an object of the present invention is to provide a method of reducing image noise. In the method, when a bilateral filter is used for reducing image noise, the domain weight value and range weight value of the target pixel to be reconstructed by the bilateral filter are adjusted, so as to enhance the effect of noise reduction by the adjusted bilateral filter, thereby solving the problem mentioned in the prior art.

In order to achieve the above object, the method disclosed in the present invention includes the following steps: selecting one from unreconstructed pixels in an image containing a plurality of pixels as a target pixel, and setting a plurality of reference pixels corresponding to the target pixel; calculating the range value of each reference pixel corresponding to the target pixel, meanwhile obtaining an intensity deviant by converting the intensity of the image, and then calculating the range weight value of each reference pixel to the target pixel according to the intensity deviant and the range value; calculating the domain weight value of each reference pixel to the target pixel according to the domain value of each reference pixel corresponding to the target pixel; calculating the smoothness value of the target pixel, obtaining a smooth weight value by converting the smoothness value, and adjusting the domain weight value by the smooth weight value; and reconstructing the target pixel according to the range weight value of each reference pixel to the target pixel and the adjusted domain weight value.

The detailed features and practice of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Both range weight value and domain weight value adopted by a bilateral filter for reducing image noise are calculated by shift-invariant Gaussian filter (Gaussian smooth function). As the Gaussian smooth function used for calculating the range weight value and the domain weight value is respectively in the form of $$S(\xi, x) = e^{-\frac{1}{2}\left(\frac{\delta(f(\xi), f(x))}{\sigma_r}\right)}, \quad C(\xi, x) = e^{-\frac{1}{2}\left(\frac{d(\xi, x)}{\sigma_d}\right)},$$

in which $\xi$ is a reference pixel, x is a target pixel, f(x1) is the intensity of a pixel x1, $\delta(f(x1), f(x2))$ is the intensity difference between the pixel x1 and pixel x2, d(x1,x2) is the domain between the pixel x1 and pixel x2, $\sigma d$ is a parameter for adjusting the intensity of the domain Gaussian function, and $\sigma r$ is a parameter for adjusting the intensity of the range Gaussian function. Therefore, in practice, the calculation of the Gaussian filter can be substituted by a discrete weight value after the calculation of the range weight value and the domain weight value. In this embodiment, the calculation of the Gaussian filter is substituted by looking up in a table.

The present invention is directed to adjust the range filter and the domain filter in a bilateral filter, i.e. adjusting the range weight value and the domain weight value of each reference pixel of the target pixel to be reconstructed, so as to enhance the effect of image noise reduction (especially the effect of the high noise reduction) by a bilateral filter in the conventional art. Therefore, the operating method of reducing the noise of an image provided by the present invention is similar to that of a bilateral filter in reconstructing all pixels in the image, and the difference lies in the addition of the step of adjusting the range weight value and the domain weight value compared with the conventional art.

Figure 1:
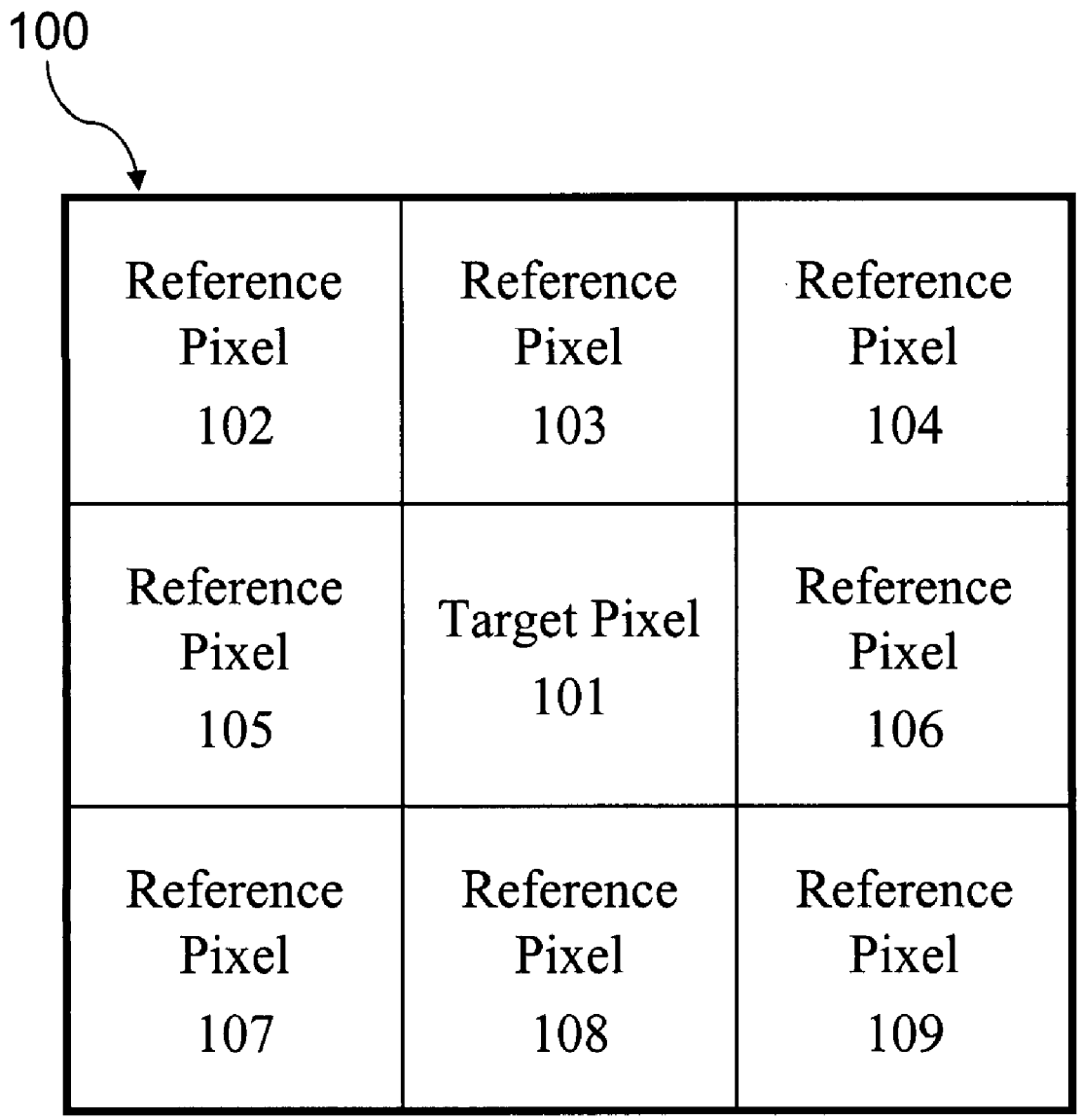
FIG. 1 is a schematic view of the positions of the target pixel and the reference pixels according to a prior art.
Figure 2:
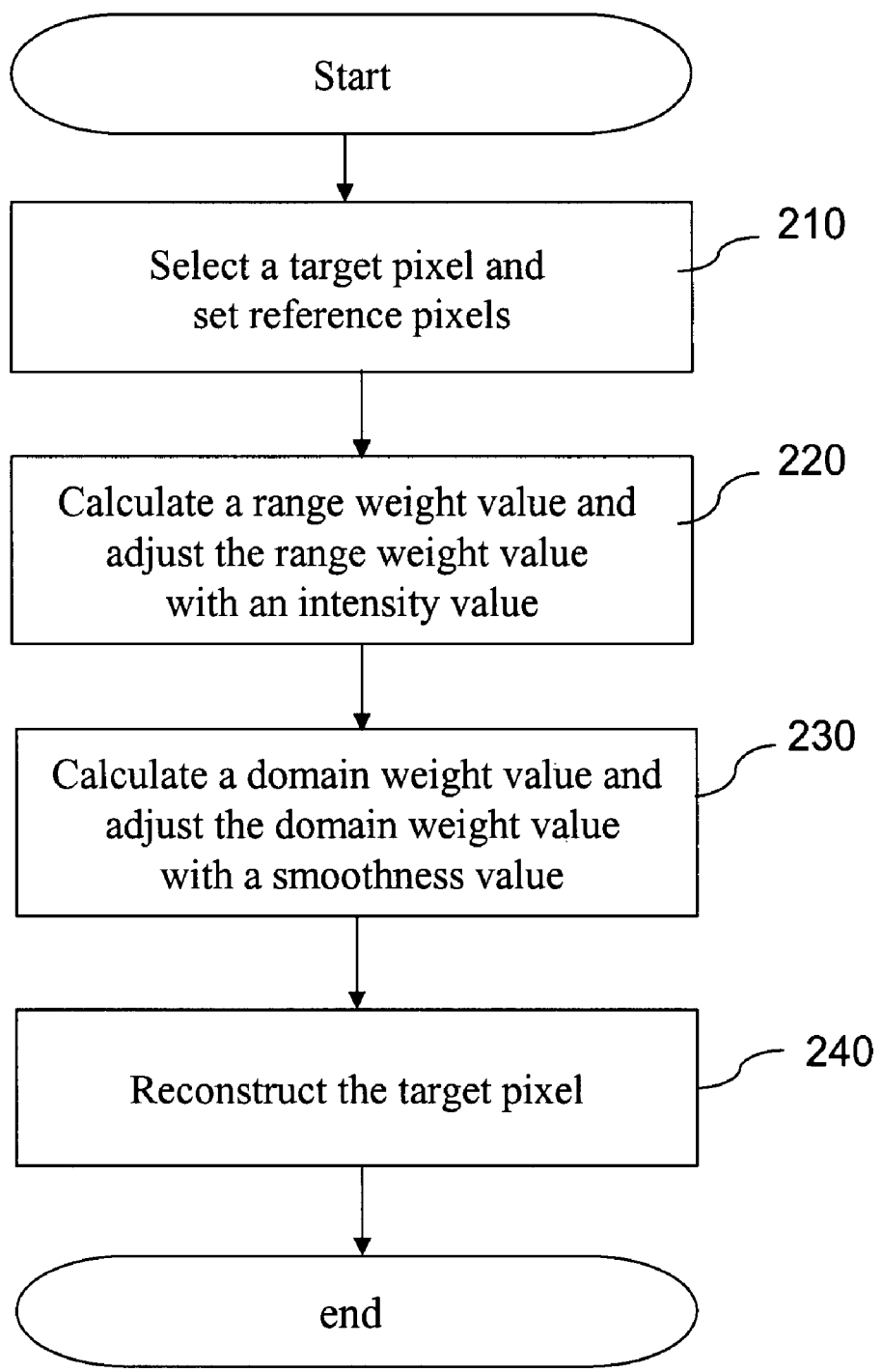
FIG. 2 is a flow chart of the method of reducing image noise according to the present invention.

Next, the operating system and method of the present invention are illustrated below by an embodiment with reference to a flow chart of the method of reducing image noise provided by the present invention in FIG. 2. First, the present invention selects a pixel from all the pixels in an image as a target pixel (Step 210), and after the target pixel 101 is selected, the present invention sets a reference scope as the 3×3 table 100 of nine-square grid as shown in FIG. 1. The target pixel 101 is in the centre of the table 100 and the rest are reference pixels of the target pixel 101. Then, the present invention calculates the range weight value and the domain weight value of the first reference pixel to the eighth reference pixel 102 to 109 corresponding to the target pixel 101 by the bilateral filter in the conventional art, and adjusts the calculated range weight value and domain weight value. There is no sequence in adjusting the range weight value and the domain weight value, i.e., the range weight value can be adjusted first, or the other way round.

The adjustment of the range weight value is first illustrated as follows. When the intensity of the image is very high, the minute change of the image is not easy to be distinguished by a human eye, and thus the noise is low. On the contrary, when the intensity of the image is low, i.e., the image is dim; a higher noise is easy to be generated. Therefore, a larger reference scope can be adopted to obtain more reference pixels of the reconstructed target pixel, so as to improve the effect of noise reduction. When the intensity of the target pixel is low, if the range weight value is adjusted with a large intensity deviant ($W_{Intensity}$), the range weight value obtained by looking up in a table is larger than that obtained when the target pixel has a higher intensity, thus raising the reference proportion of the reference pixel and improving the effect of noise reduction. As such, the range weight values of the reference pixels of the same range vary according to target pixels of different intensities.

Figure 3A:
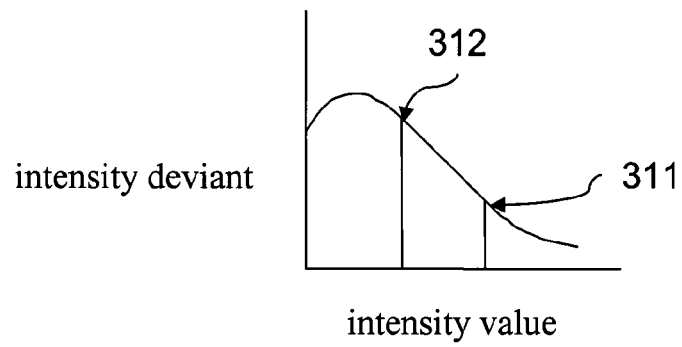
FIG. 3A is a graph of the intensity to intensity deviant according to the present invention.
Figure 3B:
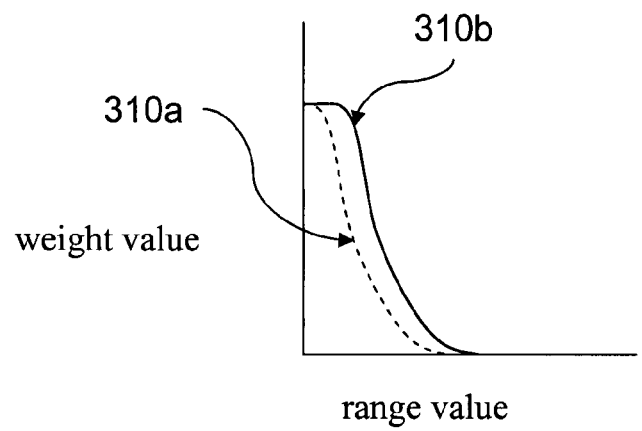
FIG. 3B is a graph of the adjusted range weight value according to the present invention.
Figure 3C:
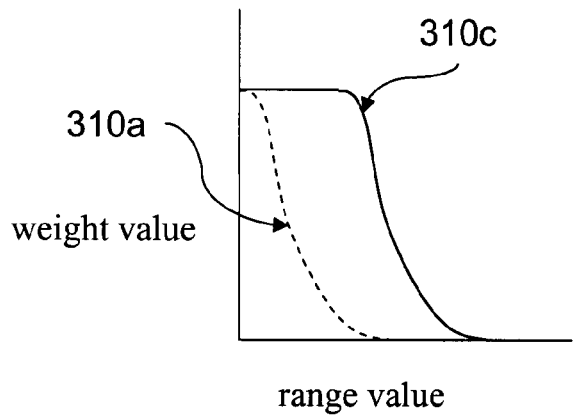
FIG. 3C is a graph of the adjusted range weight value according to the present invention.

After obtaining the intensity deviant, the present invention adjusts the range weight value of each reference pixel to the target pixel 101 with the intensity deviant (Step 220). In this embodiment, the range weight value is adjusted by calculating the range weight value of the reference pixel to the target pixel with the sum of the range (S) of the reference pixel to the target pixel and the corresponding intensity deviant. That is to say, if the method of generating the range weight value by a bilateral filter in the conventional art is represented by Range Table (S), this embodiment generates the range weight value with Range Table (S+$W_{intensity}$). Therefore, the range weight value of each reference pixel of the target pixel 101 can be obtained by looking up in the range weight table with the sum of the range and the corresponding intensity deviant. As shown in FIG. 3A, if the first reference pixel 102 of the target pixel 101 obtains a first intensity deviant 311 as 10 when the target pixel 101 is of a high intensity, the first reference pixel 102 can use the first intensity deviant 311 to adjust a conventional first range weight value curve 310a into a second range weight value curve 310b as shown in FIG. 3B. Similarly, when the target pixel 101 is dim and the first reference pixel 102 obtains a second intensity deviant 312 of 30, the first reference pixel 102 can use the second intensity deviant 312 to adjust the range weight value to result in a third range weight value curve 310c as shown in FIG. 3C. It can be concluded from the second range weight value curve 310b and the third range weight value curve 310c that the higher the intensity deviant of the first reference pixel 102 is, the higher the range weight value will be, thereby enhancing the image noise reduction by the range filter.

The adjustment of the domain weight value is illustrated below. The present invention employs the conventional $$\sqrt{\frac{\sum (x - \bar{x})^2}{N}} \text{ (standard deviation) or}$$

$$\frac{\sum |x - \bar{x}|}{N} \text{ (gradient), etc.,}$$

to obtain the smoothness of a regional area of the target pixel to be reconstructed, and the smoothness is used to differentiate whether the target pixel is located in the smooth area or detailed area. If the target pixel is located in the smooth area, the image noise can be reduced by a method similar to evening the domain weight value, so as to improve the smoothness of the image. If the target pixel is located in the detailed area, the reduction effect by the bilateral filter is preserved to prevent the detailed area from becoming fuzzy. As an image consists of various frames, each having a boundary with another, one image must possess both smooth area and detailed area at the same time. As the regional area formed by three reference pixels corresponding to the reconstructed target pixel often contains both smooth area and detailed area, in order not to determine whether the target pixel is located in the smooth area or the detailed area by dichotomy, the smooth weight value ($W_{smooth}$) can be acquired by looking up in the smooth weight table with an obtained smoothness, such that the noise reduction method applied to the target pixels around the boundary of the smooth area and the detailed area transits from even domain weight filter to bilateral filter.

Figure 4:
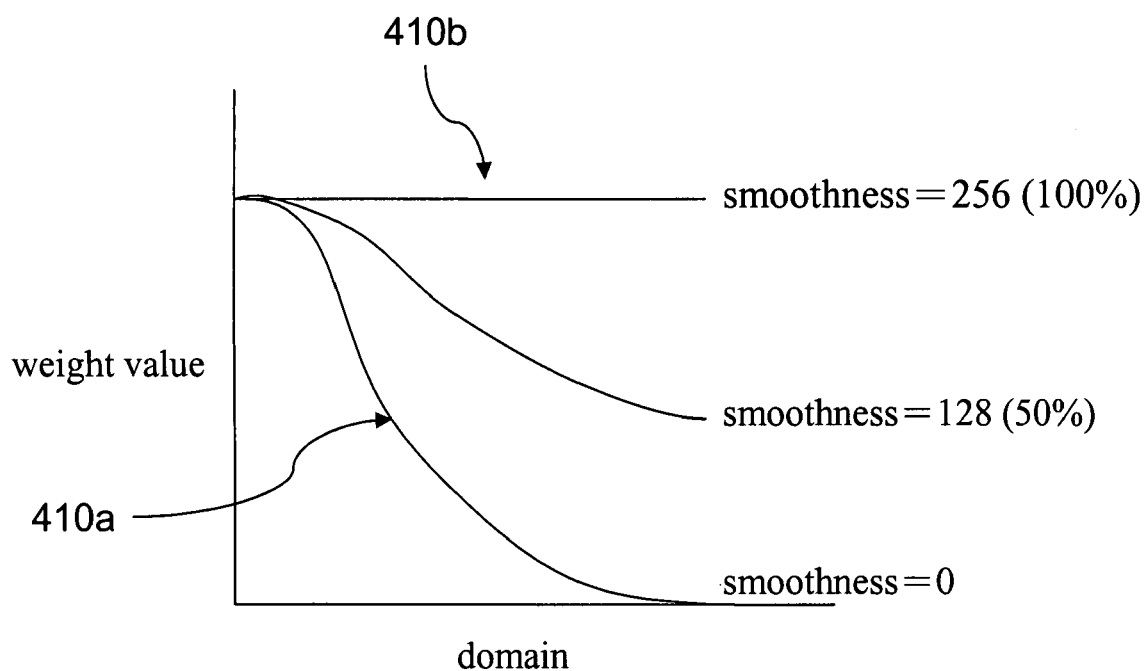
FIG. 4 is a graph of the domain weight value according to the present invention.

After the smooth weight value is generated, the present invention establishes connection between the smooth weight value and a conventional formula for calculating the domain weight value by the bilateral filter, such that the domain weight value of each reference pixel to the target pixel can be adjusted through the smooth weight value (Step 230). In this embodiment, the domain weight value adjusted by the present invention is calculated by the formula $W_{domain} = W_{domain\_prior} + (256 - W_{domain\_prior}) \times W_{smooth} \div 256$, in which $W_{domain\_prior}$ is the domain weight value calculated by the conventional method of the bilateral filter, and 256 is the conventional maximum domain weight value. According to the above formula, when $W_{smooth}$ gradually turns from 0 to 256, the resulted $W_{domain}$ by the Gaussian filter will change. As shown in FIG. 4, a conventional first domain weight value curve 410a will change into a second domain weight value curve 410b due to the adjustment of the smooth weight value. The smooth weight value is 0 when the target pixel is located in the detailed area, so the above formula is transformed into $W_{domain} = W_{domain\_prior}$, which means the target parameter is reconstructed by the bilateral filter at this moment. When the target pixel is located in a more smooth area, the smooth weight value will be closer to 256, and the $W_{domain}$ will be closer to 256 according to the above formula. When $W_{domain} = 256$, the domain weight values of all the reference pixels are the same, such that the noise reduction method is similar to that of a mean filter. When the domain weight value is adjusted to approach an even weight, the reference proportion of the reference pixels can be raised to achieve an effect almost the same as using a mean filter, thereby evening and reducing the noise. As such, the effect of image noise reduction by the domain filter can be enhanced to solve the problem that the conventional domain weight value cannot effectively reduce the high image noise accompanying a high ISO image.

After the range weight value and the domain weight value of all the reference pixels to the target pixel are adjusted by the present invention, the present invention reconstructs the target pixel with a method similar to a conventional one (Step 240), and afterwards selects other pixels as new target pixels to be reconstructed by the aforementioned method till the entire image is reconstructed, so as to obtain an image with the noise reduced, thus solving the problem mentioned in prior art.

Furthermore, the method of reducing image noise provided by the present invention is applicable to hardware, software, and the combination of the two. Besides, the present invention can also be realized in computer systems in a centralized way or distributed in several interconnected computer systems as different components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of reducing image noise, comprising:

selecting one from unreconstructed pixels of an image containing a plurality of pixels as a target pixel, and setting a plurality of reference pixels corresponding to the target pixel;

calculating a range value of each reference pixel to the target pixel, meanwhile obtaining an intensity deviant by converting an intensity of the target pixel, and then calculating a range weight value of each reference pixel to the target pixel by the intensity deviant and the range value;

calculating a domain weight value of each reference pixel to the target pixel according to a domain value of each reference pixel corresponding to the target pixel;

calculating a smoothness value of the target pixel, obtaining a smooth weight value by converting the smoothness value, and adjusting the domain weight value with the smooth weight value by adjusting the strength of a domain weight filter; and reconstructing the target pixel according to the range weight value of each reference pixel to the target pixel and the adjusted domain weight value.

2. The method of reducing image noise as claimed in claim 1, wherein the process of adjusting the domain weight value comprises:

calculating a difference between a maximum domain weight value and the domain weight value;

calculating an adjustment proportion according to the difference, the smooth weight value, and the maximum domain weight value; and setting the adjusted domain weight value according to the domain weight value and the adjustment proportion.

3. The method of reducing image noise as claimed in claim 1, wherein the process of reconstructing the target pixel is dividing a sum total of product of pixel value of each reference pixel and the corresponding domain weight value and the corresponding smooth weight value by a sum total of product of the corresponding domain weight value and the corresponding smooth weight value of each reference pixel.

4. The method of reducing image noise as claimed in claim 1, wherein the range weight value is generated with RangeTable (S+Wintensity), S is the range value, and Wintensity is the intensity deviant.

* * * * *